US012724372B2

(12) United States Patent
Doyo

(10) Patent No.: US 12,724,372 B2
(45) Date of Patent: Sep. 1, 2026

(54) SHEET CONVEYING DEVICE AND IMAGE FORMING APPARATUS

(71) Applicant: KYOCERA Document Solutions Inc., Osaka (JP)

(72) Inventor: Hideaki Doyo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/065,154

(22) Filed: Feb. 27, 2025

(65) Prior Publication Data

US 2025/0278050 A1 Sep. 4, 2025

(30) Foreign Application Priority Data

Feb. 29, 2024 (JP) ............................ JP2024-029750

(51) Int. Cl.
*G03G 15/00* (2006.01)

(52) U.S. Cl.
CPC .................. *G03G 15/6564* (2013.01); *G03G 2215/00945* (2013.01)

(58) Field of Classification Search
CPC ................ G03G 15/6564; G03G 2215/00945
See application file for complete search history.

(56) References Cited

U.S. PATENT DOCUMENTS

2006/0051145 A1 3/2006 Ubayashi
2011/0169214 A1* 7/2011 Hosaka .................... B41J 29/10 271/226
2013/0094888 A1* 4/2013 Maeshima ............... B65H 7/08 399/388
2014/0042693 A1 2/2014 Endo
2015/0249764 A1* 9/2015 Nakatani ............ H04N 1/00602 358/1.5
2015/0251863 A1* 9/2015 Tateishi ................. B65H 5/062 271/152
2020/0363763 A1* 11/2020 Sakaguchi ............... B65H 5/26
2020/0369483 A1* 11/2020 Itoh ........................ B65H 5/062

FOREIGN PATENT DOCUMENTS

JP 2006069784 A 3/2006

OTHER PUBLICATIONS

European Patent Office, Extended European Search Report Issued in Application No. 25159616.9, Jul. 30, 2025, 8 pages.

* cited by examiner

*Primary Examiner* — David H Banh
(74) *Attorney, Agent, or Firm* — Alleman Hall LLP

(57) ABSTRACT

A sheet conveying device includes: a first conveying roller; a second conveying roller; a sheet sensor; and a speed control unit that controls a conveying speed of a sheet by each of the first conveying roller and the second conveying roller, the speed control unit being configured to change, where a leading edge of a second sheet has not been detected at a reference time point, the conveying speed by the first conveying roller from an initial speed to a high speed faster than the initial speed, maintain the conveying speed by the second conveying roller at the initial speed, determine return timing on the basis of a second elapsed amount, and return the conveying speed by the first conveying roller from the high speed to the initial speed at the determined return timing.

2 Claims, 8 Drawing Sheets

SHEET CONVEYING DEVICE AND IMAGE FORMING APPARATUS

INCORPORATION BY REFERENCE

This application is based upon and claims the benefit of priority from the corresponding Japanese Patent Application No. 2024-029750 filed on Feb. 29, 2024, the entire contents of which are incorporated herein by reference.

FIELD

The present disclosure relates to a sheet conveying device capable of conveying a sheet and an image forming apparatus including this sheet conveying device.

BACKGROUND

Image forming apparatuses such as a printer, a copier, a facsimile machine, and a multifunction device having these functions are provided with a resist roller unit including a resist roller pair. The resist roller unit stands by while the leading edge of a sheet is pressed against the nip portion of the resist roller pair being stopped to correct the inclination of the sheet and then feeds out the sheet to an image transfer position by causing the resist roller pair to be driven to rotate at predetermined feed timing that matches transfer start timing at which the transfer of an image to the sheet starts at the image transfer position.

Further, the image forming apparatus is provided with a sheet conveying device that conveys a sheet from a sheet housing unit toward the resist roller unit.

Further, for example, there is known a sheet supplying device that controls the spacing between the rear edge of the leading sheet and the leading edge of the next following sheet by changing the timing at which the conveying speed of the sheet decelerates to the conveying speed of the sheet at the image transfer position.

SUMMARY

A sheet conveying device according to an aspect of the present disclosure is a sheet conveying device that sequentially conveys a plurality of sheets, including: a first conveying roller that is driven to rotate by receiving driving force from a first drive unit to convey a sheet; a second conveying roller that is provided downstream of the first conveying roller in a sheet conveying direction and is driven to rotate by receiving driving force from a second drive unit to convey the sheet; a sheet sensor that is provided between the first conveying roller and the second conveying roller and detects a leading edge and a rear edge of the sheet; and a speed control unit that controls a conveying speed of the sheet by each of the first conveying roller and the second conveying roller. The speed control unit is configured to change, where a leading edge of a following second sheet has not been detected at a reference time point at which a first elapsed amount from a first time point at which a rear edge of a first sheet that is fed previously is detected reaches a reference amount corresponding to predetermined sheet spacing, the conveying speed of the sheet by the first conveying roller from an initial speed to a high speed faster than the initial speed, and maintain the conveying speed of the sheet by the second conveying roller at the initial speed, determine, on a basis of a second elapsed amount from the reference time point to a second time point at which the leading edge of the second sheet is detected, return timing at which the conveying speed of the sheet by the first conveying roller is returned from the high speed to the initial speed, and return the conveying speed of the sheet by the first conveying roller from the high speed to the initial speed at the determined return timing.

An image forming apparatus according to another aspect of the present disclosure includes: the sheet conveying device, a toner image being transferred to a sheet conveyed by the sheet conveying device to an image transfer position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the drawings as appropriate. The embodiments described below are merely examples embodying the present disclosure and do not limit the technical scope of the present disclosure.

Figure 1:
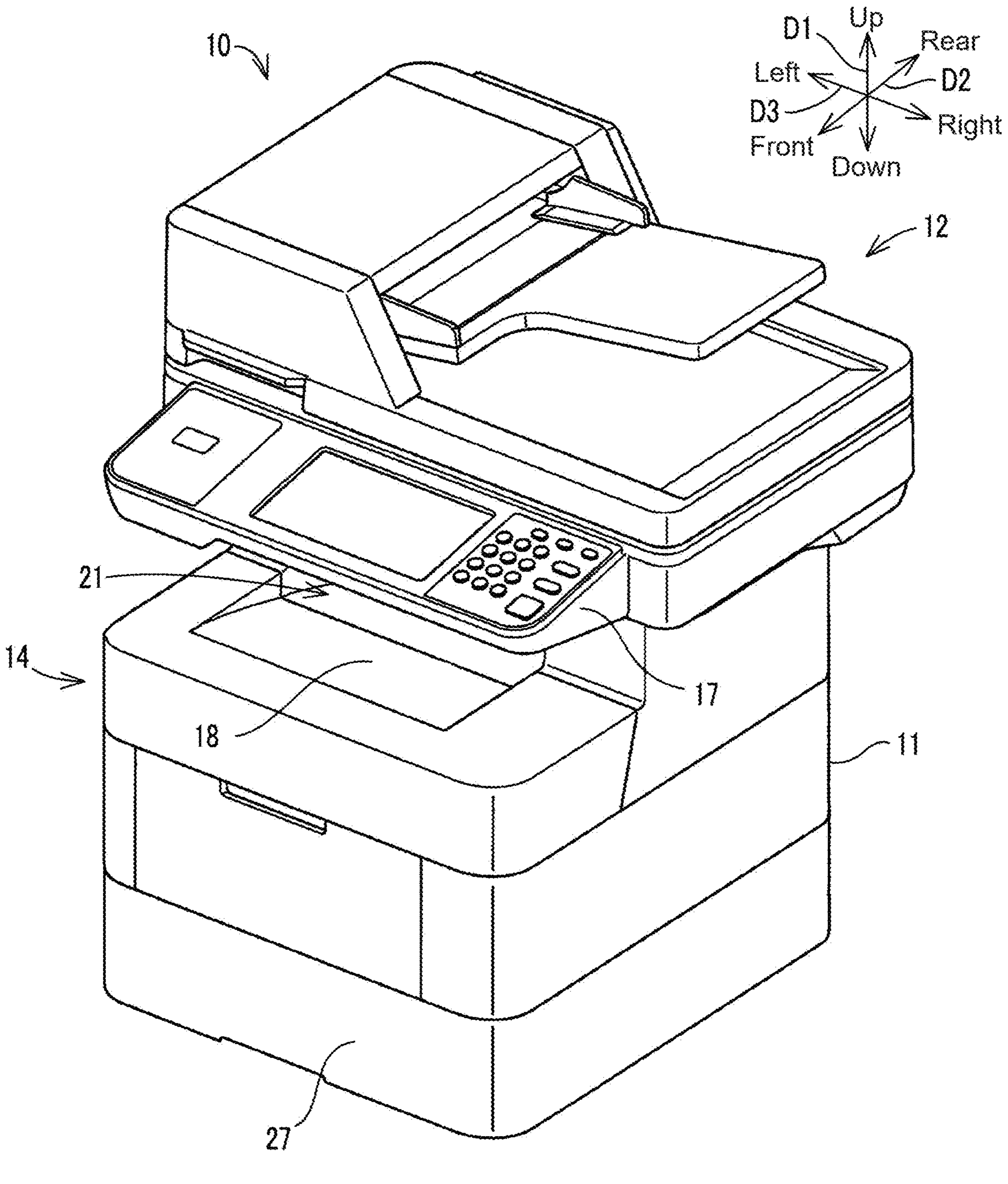
FIG. 1 is a perspective view showing a configuration of an image forming apparatus according to an embodiment of the present disclosure.
Figure 2:
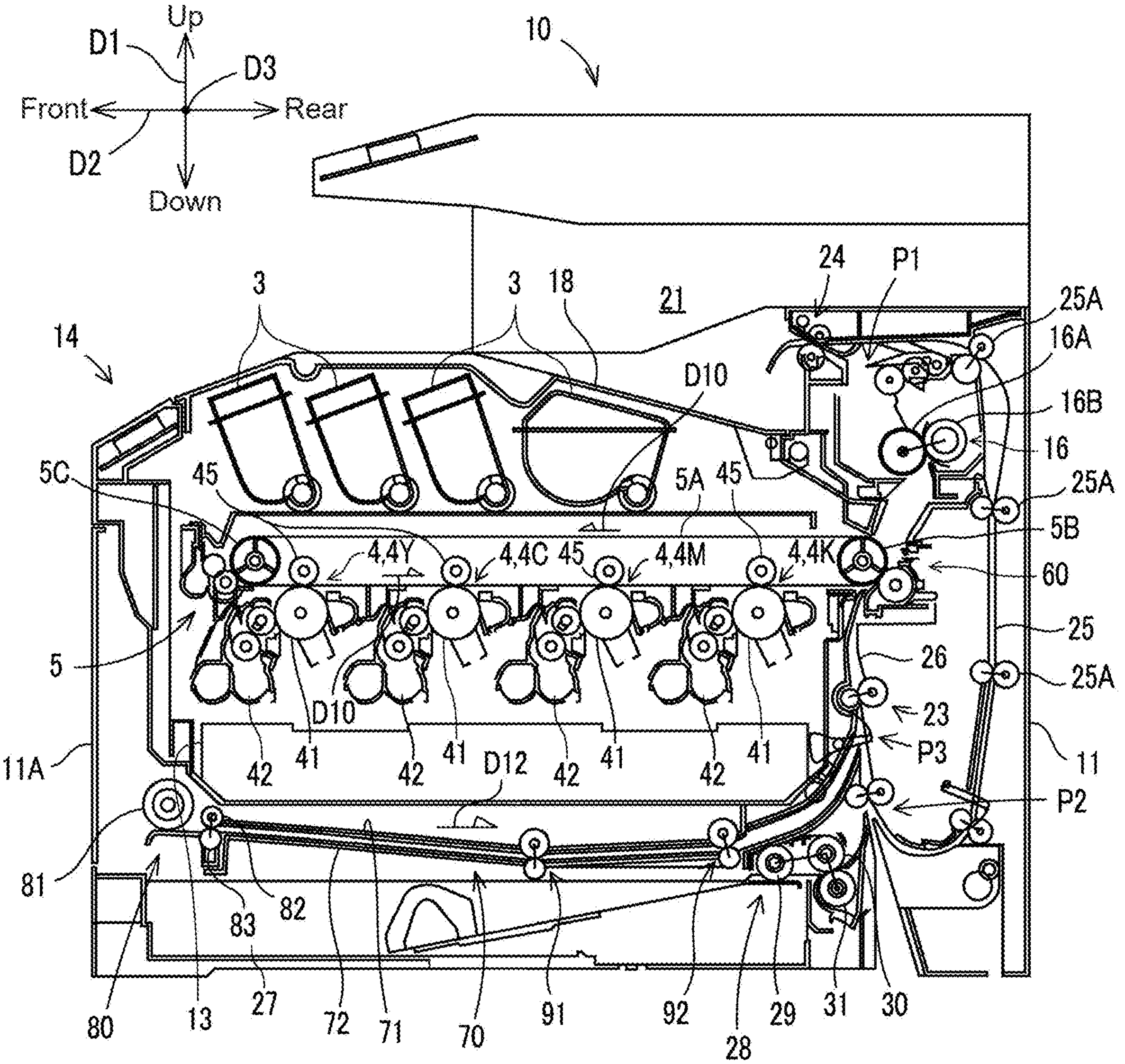
FIG. 2 is a schematic diagram showing an internal configuration of the image forming apparatus.

FIG. 1 is a perspective view showing a configuration of an image forming apparatus 10 according to the embodiment of the present disclosure. FIG. 2 is a schematic diagram showing an internal configuration of the image forming apparatus 10. In FIG. 2, illustration of an image reading unit 12 is omitted. In the following description, an up-and-down direction D1 is defined with reference to the state in which the image forming apparatus 10 is installed to be ready for use (state shown in FIG. 1), a front-and-rear direction D2 is defined with the front side (front surface side) of the image forming apparatus 10 as the front, and a right-and-left direction D3 is defined with the image forming apparatus 10 viewed from the front side (front surface side).

[Image Forming Apparatus 10]

As shown in FIG. 1, the image forming apparatus 10 is a multifunction device capable of printing an image on a sheet such as printing paper and has various functions such as a printing function, a copying function, a facsimile function, and a scanning function. The image forming apparatus 10 is not limited to the multifunction device and only needs to be an apparatus having a printing function of printing an image on the conveyed sheet. For example, the image forming apparatus 10 may be a printer, a copier, or a FAX machine.

The image forming apparatus 10 includes the image reading unit 12 and an image forming unit 14. The image reading unit 12 performs image reading processing of reading an image of a document and is provided in the upper part of the image forming apparatus 10. The image forming unit 14 performs image forming processing of forming a color image on the basis of an electrophotographic method and is provided in the lower part of the image forming apparatus 10.

An output space 21 is provided above the image forming unit 14. The sheet on which the image has been formed is output from a sheet output port 15A (see FIG. 2) to the output space 21.

The image forming unit 14 includes a casing 11 as a body of an apparatus. The respective units constituting the image forming unit 14 are disposed inside the casing 11. The casing 11 includes an outer frame that covers the entire image forming unit 14 and an inner frame for supporting the respective units constituting the image forming unit 14.

The image forming unit 14 forms a color image on a sheet such as printing paper on the basis of a so-called tandem method.

As shown in FIG. 2, the image forming unit 14 includes a plurality of image formation units 4, an intermediate transfer unit 5, a light scanning device 13, a secondary transfer roller 20, a fixing device 16, a sheet tray 18, a sheet housing unit 27, a first feeding unit 28, an operation display unit 17 (see FIG. 1), a sheet conveying path 26 (hereinafter, abbreviated as a conveying path 26), a sheet conveying unit 23, a resist roller unit 60, a toner container 3, a multi-sheet conveying path 70 (hereinafter, abbreviated as a conveying path 70), a second feeding unit 80, a control unit 100 (see FIG. 4), and the like. Note that the image forming unit 14 may form a monochrome image on a sheet by one image formation unit 4. In this case, the intermediate transfer unit 5 does not necessarily need to be provided.

As shown in FIG. 2, the sheet housing unit 27 is provided at the lowest part of the image forming apparatus 10. The sheet housing unit 27 houses a plurality of sheets and is formed in, for example, a tray shape with the top opened. The sheet housing unit 27 is supported by the casing 11.

The first feeding unit 28 takes a plurality of sheets stacked in the sheet housing unit 27 one sheet at a time and sequentially feeds the taken sheet toward the conveying path 26. The first feeding unit 28 includes a pick-up roller 29, a feed roller 30, and a separation roller 31. The pick-up roller 29 and the feed roller 30 are provided above the rear portion of the sheet housing unit 27. The separation roller 31 is provided on the lower side of the feed roller 30 while being in contact with the roller surface of the feed roller 30. Since the separation roller 31 is provided, even if a plurality of sheets is picked up by the pick-up roller 29, only the topmost sheet of the fed sheets is separated from the other sheets by the separation roller 31.

Figure 4:
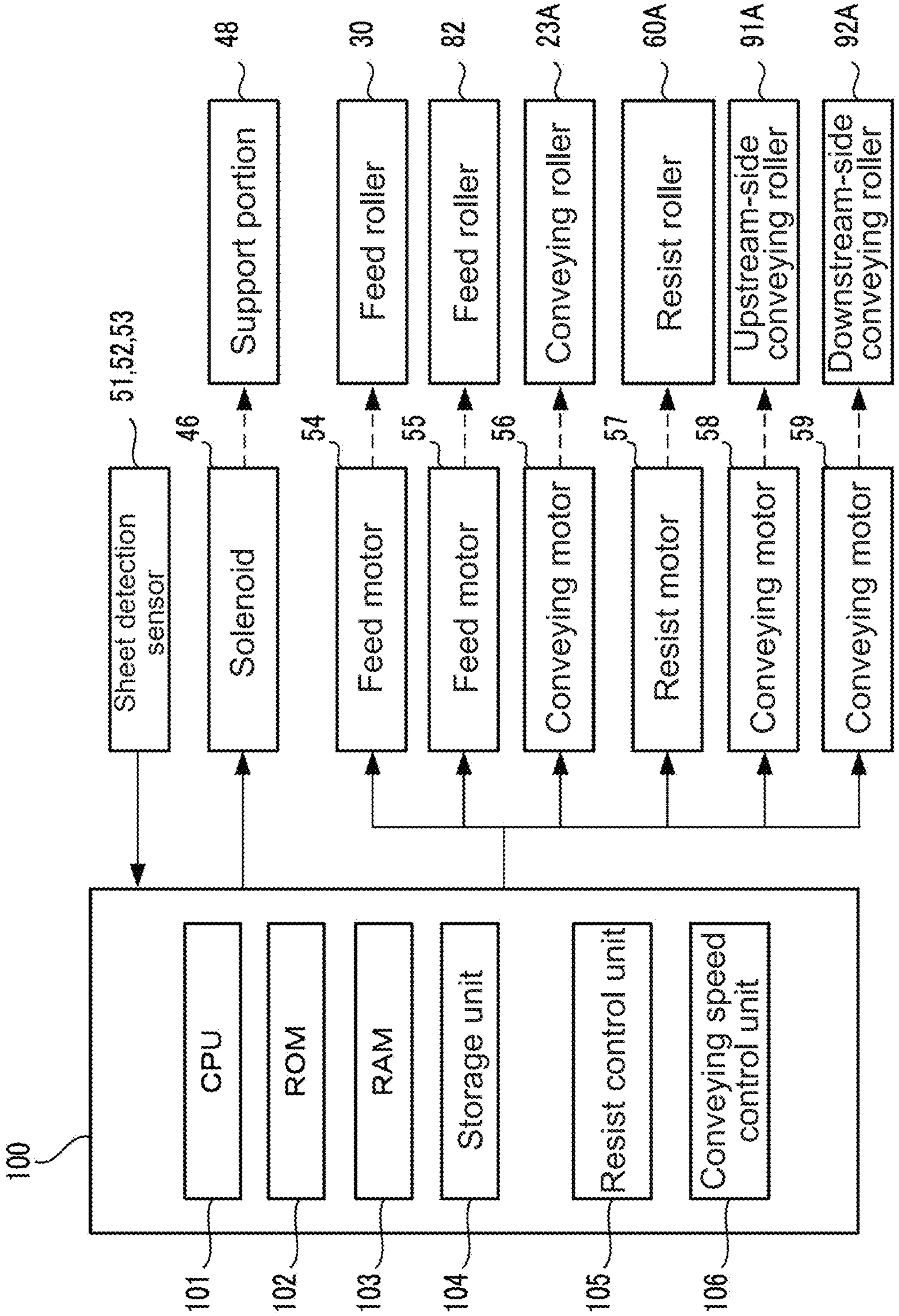
FIG. 4 is a block diagram showing a configuration of the image forming apparatus.

The feed roller 30 is connected to a feed motor 54 (see FIG. 4). The feed roller 30 conveys the sheet to the downstream side in the conveying direction D11 by receiving the rotational driving force from the feed motor 54. A drive transmission mechanism (not shown) that transmits the rotation of the feed roller 30 to the pick-up roller 29 is provided between the feed roller 30 and the pick-up roller 29. The pick-up roller 29 and the feed roller 30 are connected via the drive transmission mechanism. When the feed roller 30 is caused to rotate by the feed motor 54, the pick-up roller 29 also rotates in the same direction and at the same circumferential speed as those of the feed roller 30 by the drive transmission mechanism.

When an instruction signal for feeding a sheet in the sheet housing unit 27 is input to the image forming apparatus 10, the feed roller 30 and the pick-up roller 29 are caused to rotate by the rotational driving force of the feed motor 54, and the sheet is fed from the sheet housing unit 27 to the conveying path 26. Specifically, a sheet in the sheet housing unit 27 is taken by the pick-up roller 29 and fed out to the downstream side in the feed direction, and when the tip portion of the sheet reaches the nip portion between the feed roller 30 and the separation roller 31, the feed roller 30 conveys the sheet to the conveying path 26.

The conveying path 26 is a guide path that guides the sheet fed by the feed roller 30 to the sheet output port 15A. As shown in FIG. 2, the conveying path 26 is curved upward from the feed roller 30 and then extends upward. The conveying path 26 passes through the secondary transfer roller 20 and reaches the sheet output port 15A.

The sheet conveying unit 23 and the resist roller unit 60 are provided in the conveying path 26.

The sheet conveying unit 23 conveys the sheet fed to the conveying path 26 by the first feeding unit 28 in the conveying direction D11 toward an image transfer position P0. The image transfer position P0 is a position where a toner image on a transfer belt 5A is transferred to the sheet and is a position where a drive roller 5B and the secondary transfer roller 20 face each other. The sheet conveying unit 23 conveys the sheet to the downstream side in the conveying direction D11 by receiving the rotational driving force from the conveying motor 56 (see FIG. 4). The configuration of the sheet conveying unit 23 will be described below.

The resist roller unit 60 is disposed upstream of the image transfer position P0 in the conveying direction D11 and downstream of the sheet conveying unit 23 in the conveying direction D11, in the conveying path 26. That is, the resist roller unit 60 is provided between the image transfer position P0 and the sheet conveying unit 23. The resist roller unit 60 corrects the inclination of the sheet conveyed through the conveying path 26 while being inclined with respect to the conveying direction D11 and conveys the corrected sheet to the downstream side in the conveying direction D11. The configuration of the resist roller unit 60 will be described below.

As shown in FIG. 2, each of the image formation units 4 is provided below the intermediate transfer unit 5. Each image formation unit 4 performs image forming processing of forming a toner image on the surface of the transfer belt 5A on the basis of image data input from the outside. The plurality of image formation units 4 is arranged along the travelling direction of the transfer belt 5A (direction indicated by an arrow D10). From the front side to the rear side of the transfer belt 5A, an image formation unit 4Y for yellow, an image formation unit 4C for cyan, an image formation unit 4M for magenta, and an image formation unit 4K for black are arranged in the stated order in a single line.

Each of the image formation units 4 includes a photoreceptor drum 41, a charging device 42, a development device 44, a primary transfer roller 45, and the like. The image formation unit 4Y forms a toner image on the surface of the photoreceptor drum 41 using a yellow toner. The image formation unit 4C, the image formation unit 4M, and the image formation unit 4K respectively form toner images on the surface of the photoreceptor drum 41 with a cyan toner, a magenta toner, and a black toner. The processing of developing the toner image on the photoreceptor drum 41 is performed by the development device 44.

The intermediate transfer unit 5 includes the transfer belt 5A, the drive roller 5B, and a driven roller 5C. The transfer belt 5A is a belt member to which toner images of respective colors, which are formed on the photoreceptor drums 41 of the image formation units 4, are transferred. The transfer belt 5A is provided above the photoreceptor drum 41. The transfer belt 5A is an endless circular belt. The transfer belt 5A is rotatably supported by the drive roller 5B and the driven roller 5C provided spaced apart in the right-and-left direction D3. The transfer belt 5A is supported by being stretched over the drive roller 5B and the driven roller 5C. When the surface of the transfer belt 5A passes between the photoreceptor drum 41 and the primary transfer roller 45, the toner image is transferred in order from each photoreceptor drum 41 in a superimposed manner. The toner image transferred to the transfer belt 5A is conveyed to the image transfer position P0 and is transferred to the sheet at the image transfer position P0.

The light scanning device 13 applies laser light to the photoreceptor drum 41 of each image formation unit 4 on the basis of the input image data of each color. This forms an electrostatic latent image on each photoreceptor drum 41. When an image forming instruction to form images on a plurality of sheets and pieces of image data corresponding to the respective sheets are input to the image forming apparatus 10, the control unit 100 determines scanning start timing at which laser scanning on the photoreceptor drum 41 with laser light based on the image data is started and applies the laser light to the photoreceptor drum 41 at the scanning start timing determined for each of the plurality of sheets.

The secondary transfer roller 20 is provided to face the drive roller 5B with the conveying path 26 extending vertically sandwiched therebetween. The secondary transfer roller 20 performs transfer processing of transferring the toner image on the transfer belt 5A to the sheet by the transfer potential applied to the secondary transfer roller 20. The position where the secondary transfer roller 20 transfers the toner image to the sheet is the image transfer position P0. The sheet to which the toner image has been transferred is conveyed to the fixing device 16.

The fixing device 16 heats the toner image transferred to the sheet to fix the toner image to the sheet and includes a heating roller 16A and a pressure roller 16B. The sheet conveyed to the fixing device 16 is conveyed while being sandwiched between the heating roller 16A and the pressure roller 16B. During this conveyance, heat is transmitted from the heating roller 16A to the toner image transferred to the sheet to heat the toner image. This fixes the toner image to the sheet.

The sheet that has passed through the fixing device 16, on which the image has been formed, is output from the sheet output port 15A to the sheet tray 18 by an output roller 24 provided at the most downstream end of the conveying path 26.

As shown in FIG. 2, the conveying path 70 is provided between the light scanning device 13 and the sheet housing unit 27. The conveying path 70 is a guide path that guides the sheet fed by the second feeding unit 80 described below into the conveying path 26. The conveying path 70 is formed by an upper guide member 71 and a lower guide member 72, which extend in the front-and-rear direction D2. The upper guide member 71 and the lower guide member 72 are disposed to be spaced apart at a predetermined distance so as to face each other in the up-and-down direction D1. The space sandwiched between the upper guide member 71 and the lower guide member 72 is the conveying path 70. The conveying path 70 extends in the front-and-rear direction D2 of the image forming unit 14 and is connected to the conveying path 26 at a connection point P3 (see FIG. 3) on the rear side the image forming unit 14.

A manual sheet receiving unit 11A is provided on the front surface side of the image forming unit 14. The sheet receiving unit 11A serves also as a cover for the front surface of the casing 11 of the image forming unit 14.

The sheet receiving unit 11A is configured to be capable of opening/closing the entrance of the conveying path 70 on the front surface of the casing 11. FIG. 2 shows the state in which the sheet receiving unit 11A is closed against the front surface of the casing 11. When the sheet receiving unit 11A is opened against the front surface of the casing 11 and the inner surface thereof is turned upward, a plurality of sheets having an arbitrary size can be placed on the inner surface.

The second feeding unit 80 is provided near the entrance on the front side of the conveying path 70. The second feeding unit 80 takes a plurality of sheets placed on the sheet receiving unit 11A one sheet at a time and sequentially feeds the taken sheet toward the conveying path 70. The second feeding unit 80 includes a pick-up roller 81, a feed roller 82, and a driven roller 83.

The feed roller 82 is connected to a feed motor 55 (see FIG. 4). The feed roller 82 conveys the sheet to the downstream side in a conveying direction D12 by receiving the rotational driving force of the feed motor 55. A drive transmission mechanism (not shown) that transmits the rotation of the feed roller 82 to the pick-up roller 81 is provided between the feed roller 82 and the pick-up roller 81. The pick-up roller 81 and the feed roller 82 are connected via the drive transmission mechanism. When the feed roller 82 is caused to rotate by the feed motor 55, the pick-up roller 81 also rotates in the same direction as that of the feed roller 82 by the drive transmission mechanism.

When an instruction signal for feeding a sheet in the sheet receiving unit 11A is input to the image forming apparatus 10, the feed roller 82 and the pick-up roller 81 are caused to rotate by the rotational driving force of the feed motor 55, and the sheet is fed from the sheet receiving unit 11A to the conveying path 70. Specifically, a sheet in the sheet receiving unit 11A is taken by the pick-up roller 81 and fed out to the downstream side in the conveying direction D12, and when the tip portion of the sheet reaches the nip portion between the feed roller 82 and the driven roller 83, the feed roller 82 conveys the sheet to the conveying path 70.

A first conveying roller pair 91 and a second conveying roller pair 92 are provided in the conveying path 70. The first conveying roller pair 91 and the second conveying roller pair 92 convey the sheet fed to the conveying path 70 by the second feeding unit 80 in the conveying direction D12 to the conveying path 26. The configurations of the first conveying roller pair 91 and the second conveying roller pair 92 will be described below.

In the image forming unit 14, in the case where an image is formed on both surfaces of the sheet, the sheet that has passed through the fixing device 16 and has one surface on which the image has been formed is turned over and then conveyed to the upstream side of the secondary transfer roller 20 again. In detail, the leading edge of the sheet that has one surface on which the image has been formed is exposed from the sheet output port 15A to the outside, and the output rollers 24 are stopped in this state. At this time, the rear edge of the sheet is held while being sandwiched between the output rollers 24. After that, when the output rollers 24 are driven in the reverse direction, the sheet is switched back and fed backward.

As shown in FIG. 2, in the image forming unit 14, a reverse conveying path 25 that branches off from a branch point P1 defined on the downstream side of the fixing device 16 in the conveying path 26 and is connected to a merging point P2 defined in the conveying path 26 is formed. The merging point P2 is defined upstream of the sheet conveying unit 23 in the conveying path 26. The sheet that has been fed backward from the sheet output port 15A is guided into the reverse conveying path 25, is conveyed by a conveying roller 25A provided in the reverse conveying path 25, merges into the conveying path 26 through the reverse conveying path 25, and is conveyed to the secondary transfer roller 20 again. After that, a toner image is transferred to the back surface of the sheet that has reached the secondary transfer roller 20, and the image is formed on the back surface of the sheet by passing through the fixing device 16. The sheet with the images formed on both surfaces thereof is output from the sheet output port 15A to the sheet tray 18 by the output roller 24 that has been returned to be driven in the forward direction.

[Sheet Conveying Unit 23]

Figure 3:
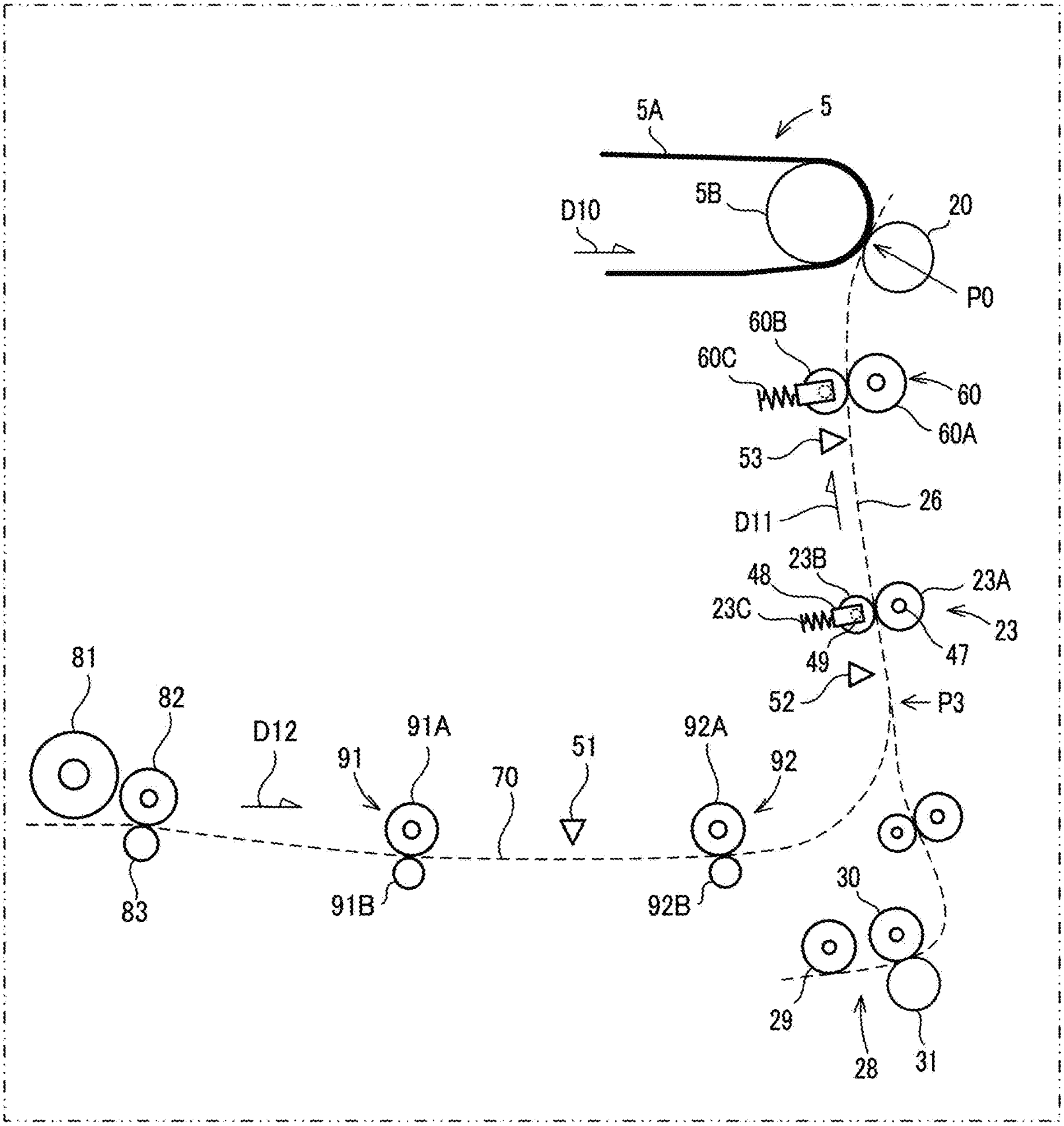
FIG. 3 is a schematic diagram showing a configuration of the periphery of a conveying path of the image forming apparatus.

As shown in FIG. 3, the sheet conveying unit 23 includes a conveying roller 23A that is driven to rotate by receiving the driving force from the conveying motor 56 (see FIG. 4) and a driven roller 23B that is disposed while being in contact with the outer peripheral surface of the conveying roller 23A. The driving force from the conveying motor 56 is transmitted to the rotation shaft 47 of the conveying roller 23A. The conveying roller 23A and the driven roller 23B realize a conveying roller pair.

A rotation shaft 49 of the driven roller 23B is biased toward the conveying roller 23A by a spring 23C with predetermined elastic force (spring force). This causes the driven roller 23B to be pressed against the conveying roller 23A. When the conveying roller 23A is driven to rotate in this state, the driven roller 23B is driven in accordance therewith.

The rotation shaft 49 of the driven roller 23B is supported by a support portion 48 provided in the guide member of the conveying path 26, or the like. In this embodiment, the driven roller 23B is supported by the support portion 48 such that it is movable between the contact position where it is in contact with the conveying roller 23A and the contact release position where it is separated from the conveying roller 23A.

FIG. 4 is a block diagram showing a configuration of the image forming apparatus 10. A solenoid 46 is provided inside the casing 11. The solenoid 46 is connected to the control unit 100 and operates when energized by the control unit 100. The plunger of the solenoid 46 is connected to the support portion 48 via a linkage member (not shown). When the solenoid 46 is energized, the plunger operates to cause the support portion 48 to move from the contact position to the contact release position. When the solenoid 46 is then de-energized, the plunger is returned to the original position by an extension spring provided in the solenoid 46 and the support portion 48 is returned to the contact position by the spring force of the spring 23C.

As shown in FIG. 3, sheet detection sensors 52 and 53 are provided in the conveying path 26. The sheet detection sensors 52 and 53 detect the leading edge or rear edge of the sheet being conveyed. The sheet detection sensors 52 and 53 are provided near the center of the conveying path 26 in the width direction.

The sheet detection sensor 52 is provided upstream of the sheet conveying unit 23 in the conveying direction D11 and downstream of the connection point P3 between the conveying path 70 and the conveying path 26, in the conveying path 26. That is, the sheet detection sensor 52 is provided between the sheet conveying unit 23 and the connection point P3. In this embodiment, the sheet detection sensor 52 is provided at a position proximate to the sheet conveying unit 23.

The sheet detection sensor 53 is provided upstream of the resist roller unit 60 in the conveying direction D11 and downstream of the sheet conveying unit 23, in the conveying path 26. That is, the sheet detection sensor 53 is provided between the resist roller unit 60 and the sheet conveying unit 23. In this embodiment, the sheet detection sensor 53 is provided at a position proximate to the resist roller unit 60.

[Resist Roller Unit 60]

As shown in FIG. 3, the resist roller unit 60 is provided in the conveying path 26. The resist roller unit 60 is provided upstream of the image transfer position P0 in the conveying direction D11 and downstream of the sheet detection sensor 53 in the conveying direction D11, in the conveying path 26.

The resist roller unit 60 corrects the inclination (convey deviation) of the sheet conveyed while being inclined with respect to the conveying direction D11 in the sheet conveying unit 23 and conveys the corrected sheet to the image transfer position P0 at predetermined timing.

As shown in FIG. 3, the resist roller unit 60 includes a resist roller 60A that is driven to rotate by receiving the driving force from a resist motor 57 (see FIG. 4) and a driven roller 60B that is disposed while being in contact with the outer peripheral surface of the resist roller 60A. The driving force from the resist motor 57 is transmitted to the rotation shaft of the resist roller 60A. The resist roller 60A and the driven roller 60B realize a conveying roller pair.

The driven roller 60B is biased toward the resist roller 60A by a spring 60C. This causes the driven roller 60B to be pressed against the resist roller 60A. When the resist roller 60A is driven to rotate in this state, the driven roller 60B is driven in accordance therewith.

[First Conveying Roller Pair 91]

In the conveying path 70, the first conveying roller pair 91 is provided downstream of the second feeding unit 80 in the conveying direction D12. The first conveying roller pair 91 includes an upstream-side conveying roller 91A (an example of the first conveying roller according to the present disclosure) that is driven to rotate by receiving the driving force from a conveying motor 58 (an example of the first drive unit according to the present disclosure, see FIG. 4) and a driven roller 91B that is disposed while being in contact with the outer peripheral surface of the upstream-side conveying roller 91A. The driving force from the conveying motor 58 is transmitted to the rotation shaft of the upstream-side conveying roller 91A. The driven roller 91B is biased toward the upstream-side conveying roller 91A by, for example, a spring (not shown).

[Second Conveying Roller Pair 92]

In the conveying path 70, the second conveying roller pair 92 is provided downstream of the first conveying roller pair 91 in the conveying direction D12 and upstream of the connection point P3 in the conveying direction D12. The second conveying roller pair 92 includes a downstream-side conveying roller 92A (an example of a second conveying roller according to the present disclosure) that is driven to rotate by receiving the driving force from a conveying motor 59 (an example of a second drive unit according to the present disclosure, see FIG. 4) and a driven roller 92B that is disposed while being in contact with the outer peripheral surface of the downstream-side conveying roller 92A. The driving force from the conveying motor 59 is transmitted to the rotation shaft of the downstream-side conveying roller 92A. The driven roller 92B is biased toward the downstream-side conveying roller 92A by, for example, a spring (not shown).

As shown in FIG. 3, a sheet detection sensor 51 (an example of a sheet sensor according to the present disclosure) is provided in the conveying path 70. The sheet detection sensor 51 detects the leading edge or rear edge of the sheet being conveyed. The sheet detection sensor 51 is provided near the center of the conveying path 70 in the width direction. The sheet detection sensor 51 is provided downstream of the first conveying roller pair 91 in the conveying direction D12 and upstream of the second conveying roller pair 92, in the conveying path 70. That is, the sheet detection sensor 51 is provided between the first conveying roller pair 91 and the second conveying roller pair 92. In this embodiment, for example, the sheet detection sensor 51 is provided at substantially the midpoint between the first conveying roller pair 91 and the second conveying roller pair 92.

Each of the sheet detection sensors 51 to 53 is, for example, a reflective optical sensor. Each of the sheet detection sensors 51 to 53 is connected to the control unit 100 and the detection signal thereof is transmitted to the control unit 100. The control unit 100 detects the leading edge or rear edge of the conveyed sheet on the basis of the change in the detection signal transmitted from each of the sheet detection sensors 51 to 53. Note that since such a detection method has been known from the past, detailed description thereof is omitted.

Each of the feed motors 55 to 59 is, for example, a stepping motor or an inner brushless motor. These motors have high speed response and high position accuracy, but requires a certain waiting time before re-driving after stopping.

[Control Unit 100]

The control unit 100 controls the image forming apparatus 10, controls the rotational driving of each roller provided in the conveying paths 26 and 70, and controls the conveying speed of the sheet by each roller.

As shown in FIG. 4, the control unit 100 includes a CPU 101, a ROM 102, a RAM 103, a storage unit 104, and the like. The control unit 100 is electrically connected to the respective motors 54 to 59, the sheet detection sensors 51 to 53, the solenoid 46, and the like via a signal line or the like. Note that the respective motors 54 to 59 are connected to the control unit 100 and are individually driven and controlled by receiving individual control signals from the control unit 100.

The CPU 101 is a processor that executes a computer program to execute various types of data processing and predetermined control. The RAM 103 is a computer-readable volatile or non-volatile storage device. The RAM 103 temporarily stores the computer program to be executed by the CPU 101, data output or referred to by the CPU 101 when executing various types of processing, and the like. The ROM 102 is a non-volatile storage device that stores a control program such as a BIOS and an OS in advance for causing the CPU 101 to execute various types of arithmetic processing. The storage unit 104 is a flash memory that stores various types of information. The storage unit 104 stores the control program for executing various types of processing by the control unit 100, and data, a threshold value, a reference value, and the like to be used for various types of processing. Note that the storage unit 104 may be a non-volatile storage device such as an HDD and an SSD, which is connected directly to the control unit 100 or indirectly to the control unit 100 via the Internet or the like.

Incidentally, in the image forming apparatus 10, when a sheet is taken from the sheet receiving unit 11A or the sheet housing unit 27 and fed, the sheet slips on the pick-up roller or the feed roller in some cases. The slipping of the sheet causes a delay in the conveyance of the sheet. For example, when the conveyance of the sheet is delayed during the execution of a continuous printing job in which images are sequentially formed on the sheets conveyed continuously, the sheet spacing between the leading sheet (first sheet) that is fed previously and the following sheet (second sheet) that is fed next varies. In this case, the productivity of the image forming apparatus 10, i.e., the number of sheets printed per unit time, decreases. Further, in some cases, the spacing from the further next sheet becomes extremely narrow, and there is a possibility that a sheet jam occurs in the conveying path 26 or the conveying path 70. Further, if the feed timing by, for example, the resist roller 60A is made earlier in order to eliminate the variation in the sheet spacing, there is a possibility that the inclination of the sheet is not sufficiently corrected.

In this embodiment, the control unit 100 performs the speed control of the sheet being conveyed as described below, which allows, even if a delay occurs in the following sheet that is conveyed next to the leading sheet that is conveyed previously, the delay in the sheet to be made up during the conveyance of the next sheet.

The control unit 100 controls, when the CPU 101 executes the various control programs stored in the ROM 102 or the storage unit 104 in advance, the conveying speed of the sheet conveyed from the sheet receiving unit 11A or the sheet housing unit 27 toward the image transfer position P0.

As shown in FIG. 4, the control unit 100 includes various processing units such as a resist control unit 105 and a conveying speed control unit 106. Note that in this embodiment, not all of these processing units are necessarily essential and some of them can be omitted in some cases.

When the CPU 101 executes various types of arithmetic processing according to the control program, the control unit 100 functions as various processing units such as the resist control unit 105 and the conveying speed control unit 106. The control unit 100 or the CPU 101 is an example of the computer or processor that executes the control program. Note that some or all of the processing units included in the control unit 100 may include electronic circuits such as a motor driver. Further, the control program may be a program for causing a plurality of processors to function as the various processing units.

The resist control unit 105 controls the rotational driving of the resist roller 60A such that the sheet is conveyed by the sheet conveying unit 23 while the resist roller 60A of the resist roller unit 60 is stopped to deflect the sheet whose leading edge has reached the nip portion between the resist roller 60A and the driven roller 60B and then the sheet is fed out at predetermined feed timing in accordance with the transfer start timing at which the transfer of the toner image to the sheet starts at the image transfer position P0.

The conveying speed control unit 106 controls the rotational driving of the upstream-side conveying roller 91A and the downstream-side conveying roller 92A for the sheet conveyed from the sheet receiving unit 11A to control the conveying speed of the sheet conveyed through the conveying path 70. Note that the conveying speed control unit 106 is an example of the speed control unit according to the present disclosure.

Figure 5:
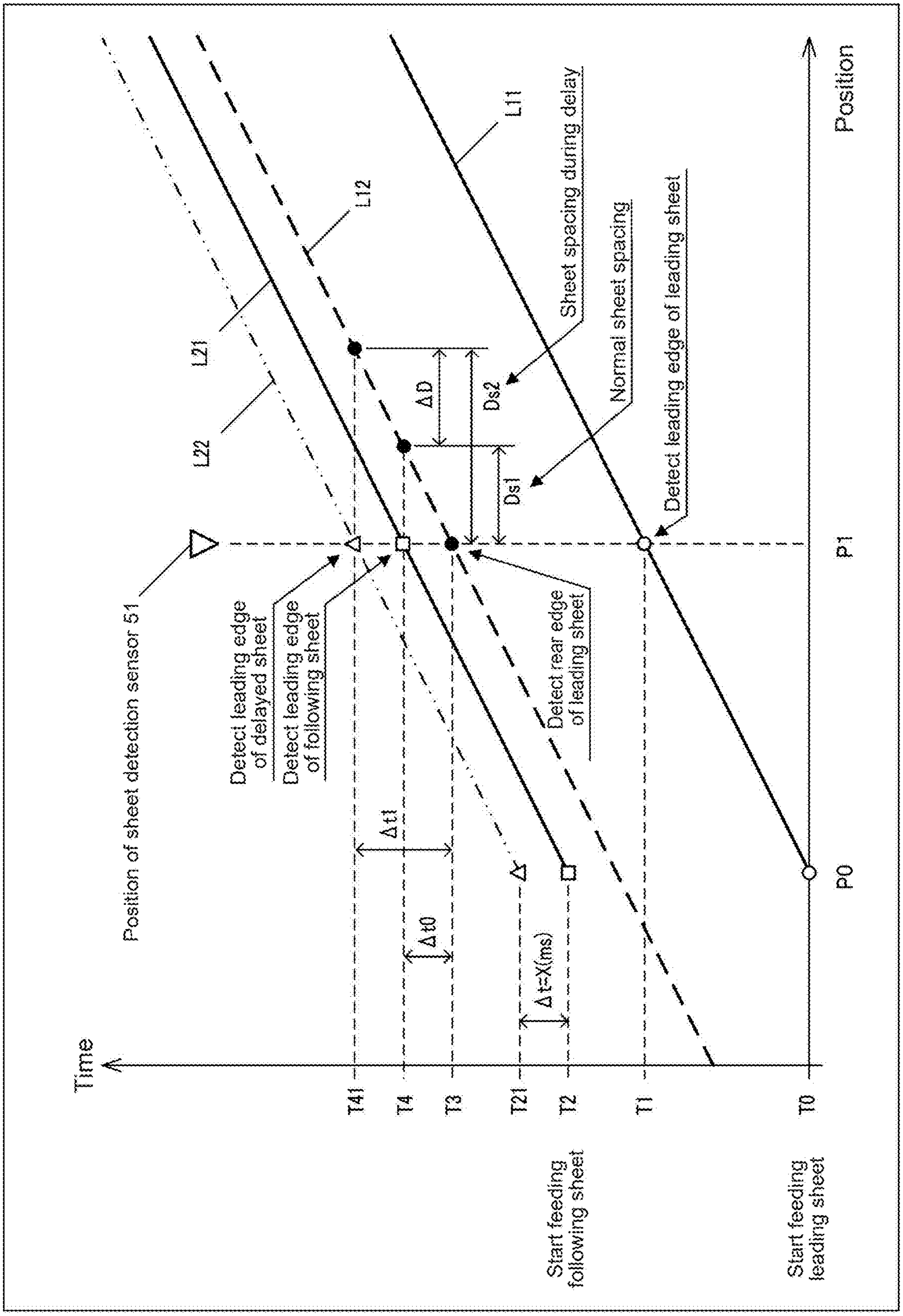
FIG. 5 is a graph showing a relationship between the position of each sheet and the arrival time point in the case where sheets are continuously conveyed from a sheet receiving unit at a constant conveying speed.
Figure 6:
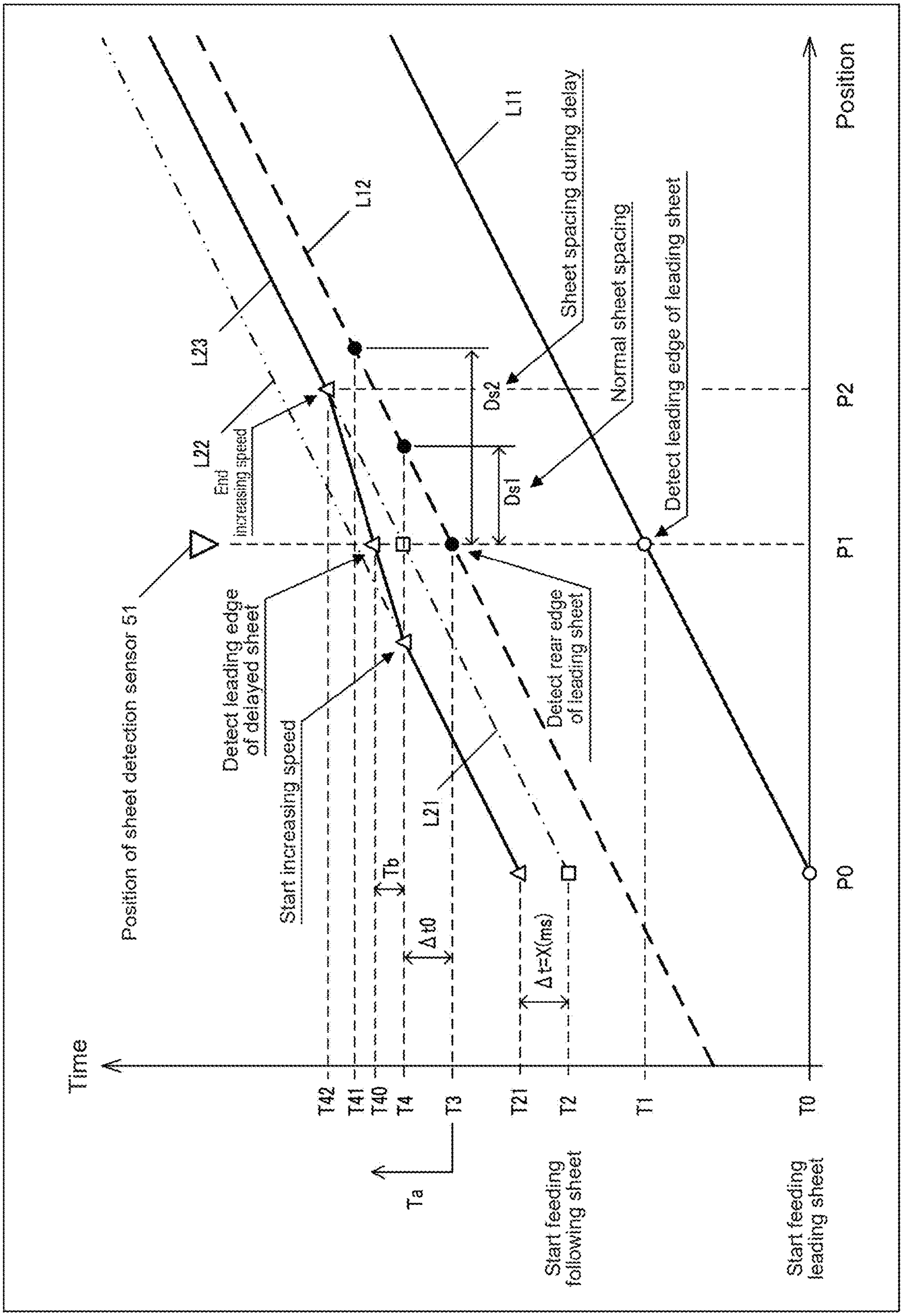
FIG. 6 is a graph showing a relationship between the position of each sheet and the arrival time point in the case where the conveying speed of the following sheet conveyed from the sheet receiving unit has been changed.

FIG. 5 and FIG. 6 are each a graph showing the relationship between the position of each sheet and the arrival time point in the case where sheets are continuously conveyed from the sheet receiving unit 11A. In FIG. 5 and FIG. 6, the horizontal axis indicates the position in the conveying direction and the vertical axis indicates the time. Further, in FIG. 5 and FIG. 6, a line L11 shown by a solid line indicates the relationship between the position of the leading edge of the leading sheet (first sheet) and the arrival time point, and a line L12 indicted by a broken line indicates the relationship between the position of the rear edge of the leading sheet and the arrival time point. Further, a line L21 shown by a solid line indicates the relationship between the position of the leading edge of the following sheet (second sheet) and the arrival time point.

FIG. 5 is a graph in the case where both the leading sheet and the following sheet are normally conveyed at the initial speed V1 without slipping. Note that in FIG. 5, a line L22 shown by a two-dot chain line indicates the position of the leading edge and the arrival time point in the case where, for example, the following sheet is fed with a delay of a delay time X (ms) (=Δt) due to slipping or the like.

As shown in FIG. 5, in the case where the sheet is conveyed normally, the feeding of the leading sheet starts at a time point T0, the timing at which the leading edge of the leading sheet is detected at a position P1 by the sheet detection sensor 51 is a time point T1, and the timing at which the rear edge of the leading sheet is detected by the sheet detection sensor 51 is a time point T3 later than the time point T2. Further, the feeding of the following sheet with predetermined set spacing Ds1 from the leading sheet starts at the time point T2 earlier than the time point T3, and the timing at which the leading edge of the following sheet is detected at the position P1 by the sheet detection sensor 51 is a time point T4 later than the time point T3.

For example, a case where the following sheet is fed at the time point T21 later than the time point T2 by the delay time X (ms) is considered. Hereinafter, the following sheet that is fed with a delay of the delay time X will be referred to as a delayed sheet in some cases.

In this case, when the conveyance continues at the initial speed V1, the leading edge of the delayed sheet follows the line L22. In the section up to the point where the leading edge of the delayed sheet reaches the position P1, whether or not the delayed sheet is delayed is unknown. However, when the leading edge of the delayed sheet reaches the position P1 and is detected by the sheet detection sensor 51, a time difference Δt1 (=T41−T3) between the time point T3 when the rear edge of the leading sheet was detected and a time point T41 when the leading edge of the delayed sheet was detected is obtained. When the time difference Δt1 is longer than a time difference Δt0 (=T4−T3) in the case where there is no delay, it is possible to determine that a delay has occurred and obtain the delay time (=Δt1−Δt0). Further, actual sheet spacing Ds2 can be obtained from the time difference Δt1 and the initial speed V1, and a delay amount ΔD (=Ds2−Ds1) indicating the degree of delay can be obtained.

In this case, the delay can be made up by increasing the conveying speed (circumferential speed) of the sheet by the upstream-side conveying roller 91A after the leading edge of the delayed sheet is detected (after the time point T4), and then the conveying speed of the sheet by the upstream-side conveying roller 91A can be returned to the initial speed V1.

However, in this speed control, in the case where the delay amount ΔD is relatively large, it is necessary to rapidly accelerate the upstream-side conveying roller 91A and then rapidly decelerate it in order to make up for the delay before the leading edge of the delayed sheet reaches the second conveying roller pair 92, and overshooting and undershooting of the conveying speed occur, which makes the conveying speed of the sheet unstable. Further, there is also a possibility that the sheet is damaged due to the rapid change in speed. Meanwhile, if the priority is given to the stability of sheet conveyance and the prevention of sheet damage, the delay cannot be made up before the leading edge of the delayed sheet reaches the second conveying roller pair 92.

On the other hand, in this embodiment, as shown by a line L23 in FIG. 6, the conveying speed control unit 106 measures, when the rear edge of the leading sheet that is conveyed previously (first sheet according to the present disclosure) is detected at the position P1 by the sheet detection sensor 51, a first elapsed time Ta (first elapsed amount according to the present disclosure) from the time point T3 (first time point according to the present disclosure). The conveying speed control unit 106 then determines, in the case where the count value of the first elapsed time Ta has reached a reference time required for the sheet with the set spacing Ds1 to be conveyed at the initial speed V1 (reference amount according to the present disclosure), whether or not the leading edge of the following sheet (second sheet according to the present disclosure) has been detected at the time point (hereinafter, referred to as a reference time point). In the case where the leading edge of the following sheet has not been detected at the reference time point, the conveying speed control unit 106 then changes the conveying speed of the following sheet by the upstream-side conveying roller 91A from the initial speed V1 to a high speed V2 faster than the initial speed V1. At this time, the conveying speed control unit 106 maintains the conveying speed of the sheet by the downstream-side conveying roller 92A at the initial speed V1.

Note that in FIG. 6, the line L23 indicating the position of the leading edge of the following sheet and the arrival time point in the case where the conveying speed of the following sheet delayed during feeding has been changed by the conveying speed control unit 106 is shown.

In this regard, in the case where the conveyance of the following sheet is delayed, the conveying speed of the sheet by the upstream-side conveying roller 91A is changed to the high speed V2 before the leading edge of the following sheet is detected.

Since the reference time is the time Δt0 (=T4−T3) required for the sheet with the set spacing Ds1 to be conveyed at the initial speed V1 and the arithmetic processing time of the speed change by the conveying speed control unit 106 is extremely short and negligible, the reference time point can be regarded as substantially the time point T4 shown in FIG. 6, i.e., the time point T4 at which the rear edge of the following sheet is detected by the sheet detection sensor 51 in the case where no delay has occurred.

Further, the conveying speed control unit 106 determines, on the basis of a second elapsed time Tb (second elapsed amount according to the present disclosure) from the reference time point to a time point T40 (second time point according to the present disclosure) at which the leading edge of the following sheet is actually detected, return timing (time point T42) at which the conveying speed is returned from the high speed V2 to the initial speed V1.

Specifically, when an estimated continuation time (estimated continuation amount according to the present disclosure) for continuing to convey the sheet at the high speed V2 after the reference time point is represented by Z, the conveying speed control unit 106 determines, as the return timing, the time point obtained by adding the estimated continuation time Z to the reference time point (time point T4).

Since the distance (=V2·Z) when the sheet is conveyed at the high speed V2 for the estimated continuation time Z is equal to the distance (=V1 (X+Z)) when the sheet is conveyed at the initial speed V1 for the delay time X (ms) and the estimated continuation time Z, the following relational expression (1) holds true.

$$V2 \cdot Z = V1(X+Z) \quad (1)$$

Further, since the distance when the sheet is conveyed at the high speed V2 for the second elapsed time Tb is equal to the distance when the sheet is conveyed at the initial speed V1 for the delay time X (ms), the following relational expression (2) holds true.

$$V2 \cdot Tb = V1 \cdot X \quad (2)$$

$$X = V2 \cdot Tb/V1$$

By substituting the above formula (2) into the above formula (1) to rearrange the estimated continuation time Z, the following calculation formula can be derived.

$$Z = V2 \cdot Tb/(V2 - V1) \quad (3)$$

In the situation where the leading edge of the delayed sheet has not actually been detected, the second elapsed time Tb is unknown and thus, the calculation formula (3) is a linear function with the second elapsed time Tb as a variable. In this embodiment, the conveying speed control unit 106 calculates, at the time point T40 when the leading edge of the delayed sheet was actually detected by the sheet detection sensor 51, the estimated continuation time Z using the second elapsed time Tb and the calculation formula (3) and determines, as the return timing, the time point T42 obtained by adding the estimated continuation time Z to the reference time point (time point T4).

When it is determined that the elapsed time from the reference time point (time point T4) has reached the return timing (time point T42), the conveying speed control unit 106 then returns the conveying speed of the sheet by the upstream-side conveying roller 91A from the high speed V2 to the initial speed V1.

As a result, as shown in FIG. 6, a position P2 of the leading edge of the delayed sheet that has been delayed matches, at the time point T42, the position of the leading edge of the following sheet in the case where there was no delay, and the delay of the following sheet is made up.

Since the conveying speed of the sheet by the upstream-side conveying roller 91A is adjusted in this way, it is possible to make up for the delay of the sheet before the delayed sheet reaches the second conveying roller pair 92, without rapidly accelerating or rapidly decelerating the upstream-side conveying roller 91A.

Note that in the case where the leading edge of the following sheet is detected by the sheet detection sensor 51 before the first elapsed time Ta reaches the reference time, this means that the following sheet is conveyed earlier than normal due to the positional deviation during feeding, double feeding, or the like. In this case, the conveying speed control unit 106 changes the conveying speed of the following sheet by the upstream-side conveying roller 91A from the initial speed V1 to a low speed V3 lower than the initial speed V1 and returns the conveying speed to the initial speed V1 after the sheet is conveyed at the low speed V3 by the amount of the time or distance corresponding to the earlier conveyance.

[Conveying Speed Control Processing]

Figure 7:
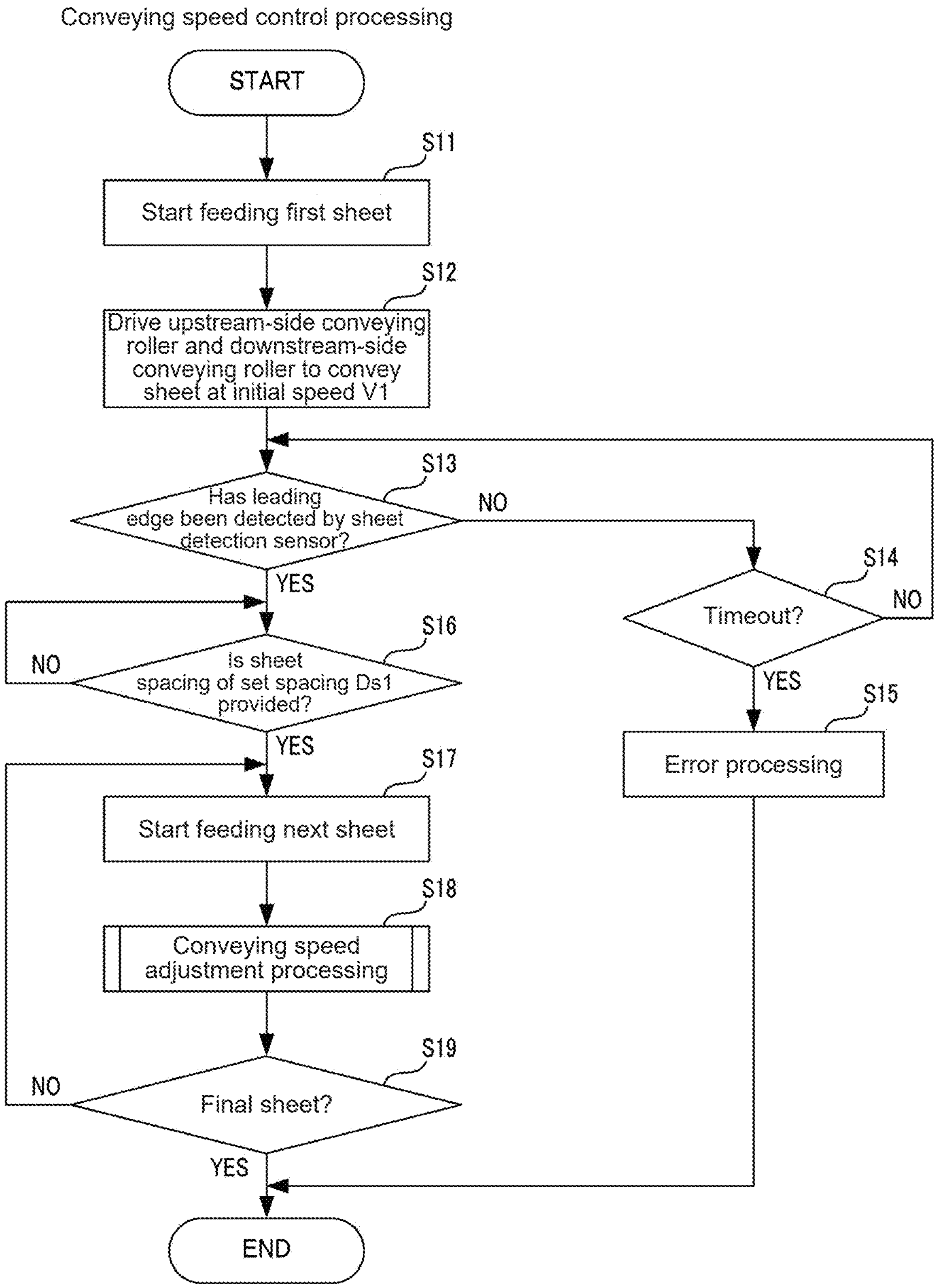
FIG. 7 is a flowchart showing an example of the procedure of conveying speed control processing executed by a control unit of the image forming apparatus.
Figure 8:
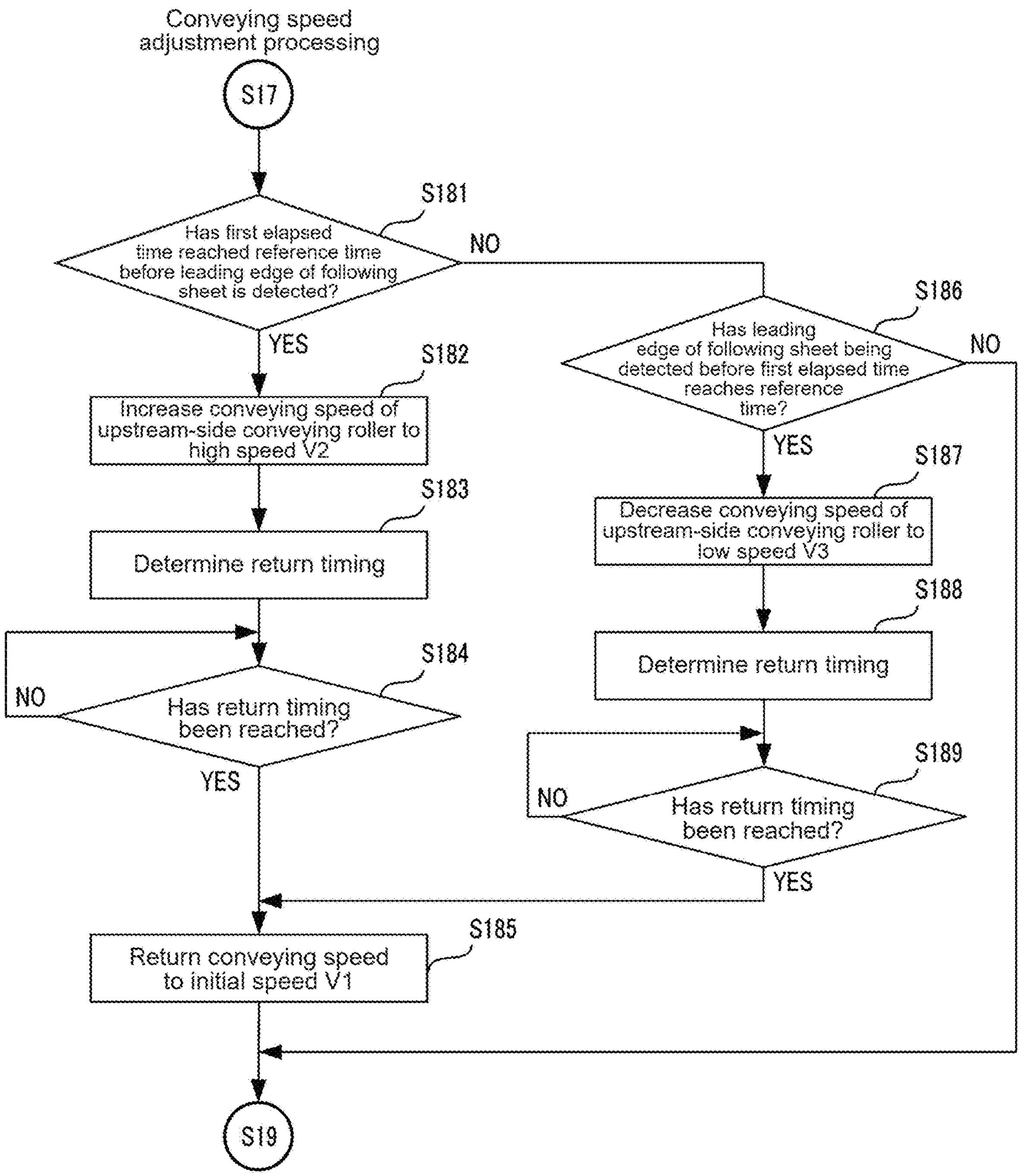
FIG. 8 is a flowchart showing an example of the procedure of conveying speed adjustment processing executed by the control unit of the image forming apparatus.

An example of the procedure of conveying speed control processing executed by the control unit 100 will be described below with reference to FIG. 7 and FIG. 8, and a conveying speed control method according to the present disclosure will be described. In FIG. 7 and FIG. 8, S11, S12, . . . indicate the numbers (Step numbers) of the processing procedure.

Note that one or a plurality of Steps included in the conveying speed control processing described below may be omitted as appropriate. Further, the order of execution of Steps in the conveying speed control processing may differ as long as the same operation and effect are achieved. Further, although a case where one processor corresponding to the control unit 100 executes the processing of each Step in the conveying speed control processing will be described below as an example, a plurality of processors may execute the respective Steps in the conveying speed control processing in a distributed manner.

The conveying speed control processing described below is executed in the case where a continuous printing job in which the sheet in the sheet receiving unit 11A is continuously conveyed and an image is printed on the sheet has been input.

As shown in FIG. 7, in Step S11, the control unit 100 drives the second feeding unit 80 to start feeding the first sheet (hereinafter, referred to a leading sheet) from the sheet receiving unit 11A. Further, in Step S12, the control unit 100 causes the upstream-side conveying roller 91A and the downstream-side conveying roller 92A to be driven to rotate to convey the leading sheet at the initial speed V1.

In Step S13, the control unit 100 determines whether or not the leading edge of the first leading sheet has been detected by the sheet detection sensor 51. In the case where the leading edge of the leading sheet has not been detected and a predetermined time has elapsed in this state, a timeout occurs and the control unit 100 determines that there is a sheet conveyance error (S14). In this case, the control unit 100 aborts the processing and performs error processing of outputting an error message (S15), and then, the series of processing ends.

Meanwhile, in the case where the leading edge of the leading sheet is detected by the sheet detection sensor 51, the sheet spacing of the set spacing Ds1 from the rear edge of the leading sheet is provided (S16), the control unit 100 starts feeding the next sheet (hereinafter, referred to as a following sheet) (S17). Note that in the case where the leading edge of the leading sheet has been detected, the control unit 100 performs conveyance by the predetermined amount obtained by adding the set spacing Ds1 to the remaining length to the rear edge and starts feeding the following sheet at the timing when the leading sheet was conveyed by the predetermined amount.

In the next Step S18, conveying speed adjustment processing of adjusting the conveying speed of the upstream-side conveying roller 91A is performed.

Specifically, as shown in FIG. 8, the control unit 100 determines whether or not the first elapsed time Ta from the time point T3 when the rear edge of the leading sheet was detected has reached the reference time before the leading edge of the following sheet is detected by the sheet detection sensor 51 (S181).

In the case where it is determined in Step S181 that the first elapsed time Ta has reached the reference time before the leading edge of the following sheet is detected, this means that a delay has occurred in the conveyance of the following sheet. In this case, the control unit 100 increases the conveying speed of the following sheet by the upstream-side conveying roller 91A from the initial speed V1 to the high speed V2 (S182).

After that, the control unit 100 calculates, after the leading edge of the following sheet is detected, the estimated continuation time Z using the calculation formula (3), and determines, as the return timing, the time point obtained by adding the estimated continuation time Z to the reference time point (time point T4) (S183).

In the case where it is determined that the elapsed time from the reference time point (time point T4) has reached the return timing (time point T42) (S184), the control unit 100 then returns the conveying speed of the sheet by the upstream-side conveying roller 91A from the high speed V2 to the initial speed V1 (S185).

Meanwhile, in the case where it is not determined in Step S181 that the first elapsed time Ta has reached the reference time before the leading edge of the following sheet is detected, the control unit 100 determines, in the next Step S186, whether or not the leading edge of the following sheet has been detected before the first elapsed time Ta reaches the reference time (S186). In the case where the leading edge of the following sheet has been detected before the first elapsed time Ta reaches the reference time, this means that the following sheet is conveyed earlier than normal due to the positional deviation during feeding, double feeding, or the like. In this case, the control unit 100 decreases the conveying speed of the following sheet by the upstream-side conveying roller 91A from the initial speed V1 to the low speed V3 lower than the initial speed V1 (S187). Note that the following sheet may be temporarily stopped for the time corresponding to the earlier arrival without decreasing the conveying speed.

After that, the control unit 100 calculates, on the basis of the initial speed V1 and the time difference between the time when the rear edge of the leading sheet was detected and the time when the leading edge of the following sheet was detected, the sheet spacing at the time point when the leading edge of the following sheet was detected, and calculates, on the basis of the low speed V3, the time required for the calculated sheet spacing to reach the set spacing Ds1. The control unit 100 then determines, as the return timing, the time point obtained by adding the required time to the time point at which the leading edge of the following sheet was detected (S188).

In the case where it is determined that the elapsed time from the time point when the leading edge of the following sheet was detected has reached the return timing (S189), the control unit 100 then returns the conveying speed of the sheet by the upstream-side conveying roller 91A from the low speed V3 to the initial speed V1 (S185).

Note that in the case where it is determined in Step S186 that the leading edge of the following sheet has not been detected before the first elapsed time Ta reaches the reference time, i.e., the timing at which the first elapsed time Ta reaches the reference time and the timing at which the leading edge of the following sheet is detected are substantially the same, the conveyance of the following sheet is not delayed or earlier and the following sheet is being conveyed with appropriate sheet spacing. In this case, the conveying speed by the upstream-side conveying roller 91A is not adjusted and is maintained at the initial speed V1.

After that, as shown in FIG. 7, the control unit 100 determines whether or not the following sheet is the final sheet (S19). In the case where the following sheet is not the final sheet, the processing returns to Step S17 and the processing of Step S17 and subsequent Steps is repeated. Further, in the case where the following sheet is the final sheet, the series of processing ends.

As described above, in this embodiment, since the above-mentioned conveying speed control processing is performed, even if the following sheet is delayed, it is possible to make up for the delay of the following sheet before the following sheet reaches the second conveying roller pair 92 on the downstream side and adjust the sheet spacing to the set spacing Ds1 without rapidly accelerating or rapidly decelerating the upstream-side conveying roller 91A. Further, in the case where the following sheet is conveyed earlier, the following sheet is temporarily decelerated. In this case, too, it is possible to adjust the sheet spacing to the set spacing Ds1.

Note that although an example of feeding a sheet from the sheet receiving unit 11A has been illustrated in the above-mentioned embodiment, the same conveying speed control processing can be applied to the conveying roller 23A of the sheet conveying unit 23 in the case where sheets are continuously fed from the sheet housing unit 27.

Further, although an example of using an elapsed time as the first elapsed amount and the second elapsed amount according to the present disclosure has been described in the above-mentioned embodiment, for example, in the case where the conveying motors 58 and 59 are each a motor that is driven by being applied with a pulse signal as in a stepping motor and has the rotation angle (rotation speed) proportional to the number of pulse signals (number of Steps), the number of Steps for the conveying motors 58 and 59 may be applied instead of the elapsed time.

Further, the image forming apparatus 10 has been illustrated as an example of the image forming apparatus according to the present disclosure and the sheet conveying device according to the present disclosure in the above-mentioned embodiment. However, the present disclosure can be considered as a sheet conveying device including the upstream-side conveying roller 91A, the downstream-side conveying roller 92A, and the control unit 100.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device that sequentially conveys a plurality of sheets, comprising:

a first conveying roller that is driven to rotate by receiving driving force from a first drive unit to convey a sheet;

a second conveying roller that is provided downstream of the first conveying roller in a sheet conveying direction and is driven to rotate by receiving driving force from a second drive unit to convey the sheet;

a sheet sensor that is provided between the first conveying roller and the second conveying roller and detects a leading edge and a rear edge of the sheet; and a speed control unit that controls a conveying speed of the sheet by each of the first conveying roller and the second conveying roller, the speed control unit being configured to control the first conveying roller and the second conveying roller to be continuously rotated during a sheet conveying operation, and control the rotation of the second conveying roller such that the conveying speed of the sheet by the second conveying roller is always an initial speed, where a leading edge of a following second sheet is detected before a first elapsed amount from a first time point at which a rear edge of a first sheet that is fed previously is detected reaches a reference amount corresponding to a predetermined set spacing, change the conveying speed of the sheet by the first conveying roller from the initial speed to a low speed that is slower than the initial speed, and maintain the conveying speed of the sheet by the second conveying roller at the initial speed, where the leading edge of the following second sheet has not been detected at a reference time point at which the first elapsed amount from the first time point at which the rear edge of the first sheet that is fed previously is detected reaches the reference amount corresponding to a predetermined sheet spacing, change the conveying speed of the sheet by the first conveying roller from the initial speed to a high speed faster than the initial speed, and maintain the conveying speed of the sheet by the second conveying roller at the initial speed, when the conveying speed of the sheet by the first conveying roller is changed from the initial speed to the low speed, calculate sheet spacing at a time point at which the leading edge of the second sheet was detected, based on the initial speed and a time difference between when the rear edge of the first sheet was detected and when the leading edge of the second sheet was detected, calculate, based on the low speed, a time required for the calculated sheet spacing to reach the predetermined set spacing, and determine a time point obtained by adding the required time to the time point at which the leading edge of the second sheet was detected as return timing at which the conveying speed of the sheet by the first conveying roller is returned from the low speed to the initial speed, when the conveying speed of the sheet by the first conveying roller is changed from the initial speed to the high speed, calculate an estimated continuation amount Z from the reference time point using the following calculation formula, and determine a time point obtained by adding the estimated continuation amount Z to the reference time point as return timing at which the conveying speed of the sheet by the first conveying roller is returned from the high speed to the initial speed:

$$Z = V2 \cdot Tb/(V2 - V1)$$

wherein, V1 represents the initial speed, V2 represents the high speed, and Tb represents a second elapsed amount, and return the conveying speed of the sheet by the first conveying roller from the low speed or the high speed to the initial speed at the determined return timing.

2. An image forming apparatus, comprising:

the sheet conveying device according to claim 1, a toner image being transferred to a sheet conveyed by the sheet conveying device to an image transfer position.

* * * * *